Figure 1:
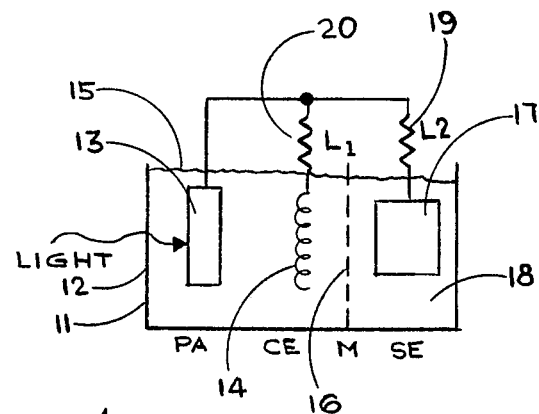

United States Patent [19]

Clark et al.

[11] 4,259,418

[45] Mar. 31, 1981

[54] PHOTOELECTROCHEMICAL CELL WITH IN-SITU STORAGE USING HYDROGEN STORAGE ELECTRODES

[75] Inventors: William D. K. Clark, Warwick; Michael N. Hull, Bardonia; John T. Arms, Monroe, all of N.Y.

[73] Assignee: The International Nickel Co., Inc., New York, N.Y.

[21] Appl. No.: 92,741

[22] Filed: Nov. 9, 1979

[51] Int. Cl.³ ...................... H01M 6/30; H01M 6/36
[52] U.S. Cl. .................................... 429/111; 204/129
[58] Field of Search ........................ 429/111; 204/129

[56] References Cited

U.S. PATENT DOCUMENTS

| 4,064,326 | 12/1977 | Manassen | 429/111 |
|---|---|---|---|
| 4,128,704 | 12/1978 | McKinzie et al. | 429/111 |
| 4,146,446 | 3/1979 | von Sturm | 204/129 |
| 4,172,925 | 10/1979 | Chen et al. | 429/111 |

FOREIGN PATENT DOCUMENTS

| 54-11450 | 1/1979 | Japan | 429/111 |
|---|---|---|---|
| 54-12581 | 1/1979 | Japan | 429/111 |

OTHER PUBLICATIONS

J. Manassen et al., "Electrochemical, Solid State, Photochemical & Technological Aspects of Photoelectrochemical Energy Converters", Nature, vol. 263, pp. 97-100 (1976).
J. Manassen et al., "Photoelectrochemical Energy Conversion & Storage", J. Electrochem. Soc., vol. 124, pp. 532-534 (1977).
Central Patents Index, Section L, Week of B10, Apr. 27, 1979, p. 39, "Oxygen-Hydrogen Fuel Battery", J5 4011-450 (1/27/79).
Central Patents Index, Section L, Week of B10, Apr. 27, 1979, p. 45, "Photocell Having P Type Semiconductor Electrode", J5 4012-581, (1/30/79).
J. Manassen et al., "Photoelectrochemical Storage Cells: The Importance of the Second & Third Electrodes", Semiconductor Liquid Junction Solar Cells, Electrochemical Society Conference Proceedings, vol. 77-3, (1977), pp. 34-37.

Primary Examiner—Aaron Weisstuch
Attorney, Agent, or Firm—F. J. Mulligan, Jr.; R. J. Kenny

[57] ABSTRACT

A photoelectrochemical system comprising an n-type photoelectrode, means associated with said photoelectrode for storing charges produced at the interface of the photoelectrode and an electrolyte and a hydrogen storage electrode in contact with a hydrogen-containing electrolyte.

7 Claims, 3 Drawing Figures

PHOTOELECTROCHEMICAL CELL WITH IN-SITU STORAGE USING HYDROGEN STORAGE ELECTRODES

The present invention is concerned with a photoelectrochemical system and more particularly with a photoelectrochemical system having in-situ storage within the containment means of the system.

BACKGROUND OF THE INVENTION AND PRIOR ART

Photoelectrochemical systems have been known since approximately 1839, when the phenomenon of the effect of light on certain electrodes was discovered by Becquerel. A recent review of the status of the art with respect to photoelectrochemical systems is contained in the Manassen et al article appearing in Vol. 263 of Nature on Sept. 9, 1978. In this article and in the Manassen et al U.S. Pat. No. 4,064,326, there is disclosed that photoelectrochemical systems can contain a photoelectrode, a counter electrode and a storage electrode. Various other storage electrodes are disclosed in the Manassen et al article in the Journal of the Electrochemical Society of Apr. 1977.

GENERAL DESCRIPTION OF THE INVENTION

The present invention contemplates a photoelectrochemical system having an n-type photoelectrode, means whereby such n-type photoelectrode can be illuminated and usually, an inert counter electrode. The counter electrode and the photoelectrode are in contact with a suitable redox electrolyte which can store the charge generated from the photoelectrode by a shift of the relative concentrations of the redox couple components. Any other means of storing the charges generated at the photoelectrode surface may be employed in place of the redox electrolyte such as a counter electrode which is activated by the oxidized form of the redox couple. Adjacent the redox electrolyte is a second, hydrogen-containing electrolyte separated therefrom by a selective, ion-permeable membrane. This second electrolyte is in contact with and is compatible with a hydrogen storage electrode. The hydrogen storage electrode includes either a metal or an intermetallic compound capable of reacting with hydrogen to form a hydride or the hydride of such metal or intermetallic compound. In operation, the photoelectrochemical system of the present invention acts by virtue of radiant energy impinging on the n-type photoelectrode to charge the hydrogen storage electrode with hydrogen. At the same time the redox couple in the electrolyte in contact with the n-type photoelectrode is oxidized during charging, electric current can be passed through a load exterior to the specific photoelectrochemical system as defined in the present application to perform useful work. Upon discharge of the storage electrode against the counter electrode in the redox electrolyte (or against another electrode activated by stored oxidic species), the electric current can be passed through the same or a different external load in order to obtain useful work.

OBJECTS OF THE INVENTION AND BRIEF DESCRIPTION OF THE DRAWINGS

It is an object of the present invention to provide an novel photoelectrochemical system.

Another object of the invention is to provide a novel process for converting optical energy to electrical energy.

The present invention is illustrated by the drawings in which

Figure 2A:
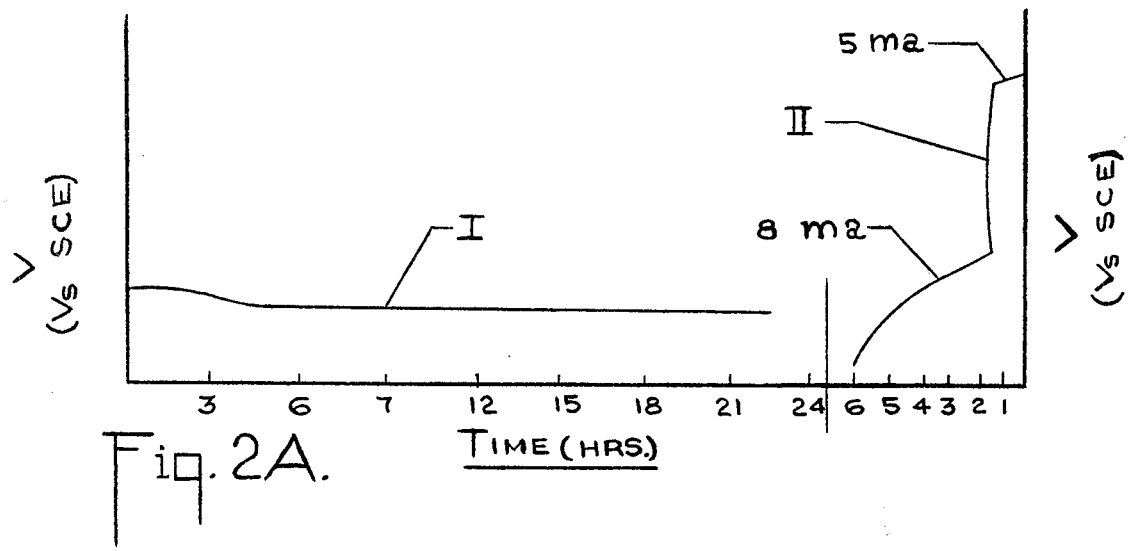
Figure 2B:
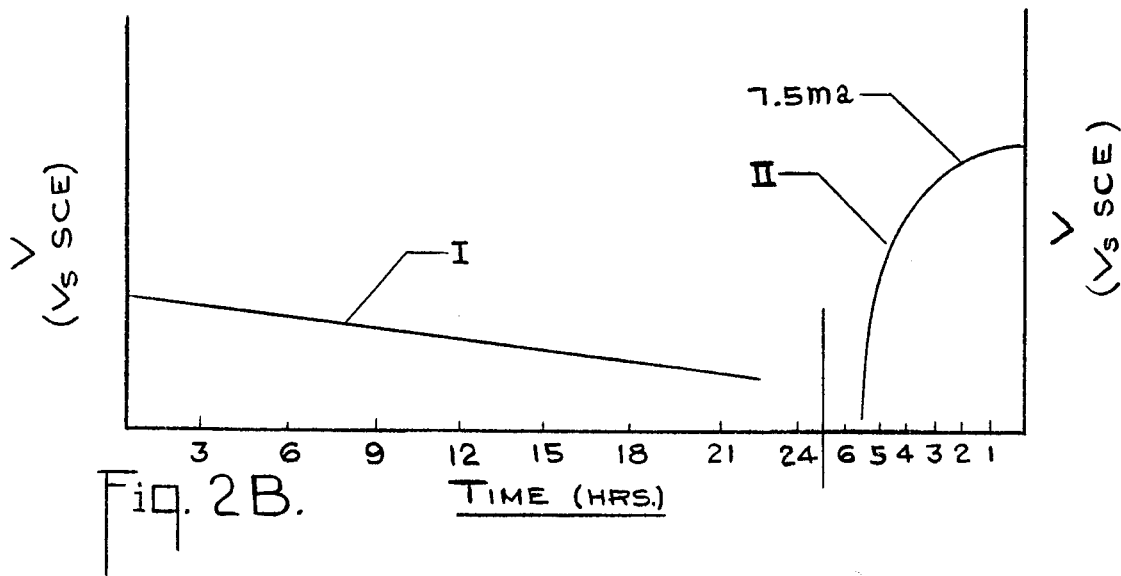

FIG. 1 is a schematic drawing of a photoelectrochemical system of the present invention, and FIGS. 2a and 2b are a series of graphs which show the operation of a photoelectrochemical system of the present invention during charging of a storage electrode by virtue of incident light falling on a photoelectrode and during discharge of the same system when light is absent.

PARTICULAR DESCRIPTION OF THE INVENTION

The photoelectrochemical system of the present invention is illustrated schematically in FIG. 1 of the drawing. Referring now thereto, the photoelectrochemical system is confined in container means 11, which container means is often a sealed container means. Container means 11 has a transparent window 12 which permits light to impinge on n-type photoelectrode 13. Window 12 must be made of a material which is transparent to the wavelengths of light to which photoelectrode 13 is sensitive. Furthermore, the light supplied through window 12 must contain wavelengths which have an energy content greater than the optical band gap of the photoelectrode being used. Both n-type photoelectrode 13 and inert counter electrode 14 are immersed in or in contact with a suitable redox electrolyte 15. Redox electrolyte 15 must contact photoelectrode 13 at the particular surface at which incident light strikes photoelectrode 13. Redox electrolyte 15 is in electrolytically conductive contact with electrolyte 18 across ion-permeable membrane 16. Storage electrode 17 comprising either a metal, an alloy or a metallic compound which reacts with hydrogen to form a hydride is immersed in or is in contact with electrolyte 18. For practical purposes electrolyte 18 must be an electrolyte which does not corrode storage electrode 17 under any reasonable electrochemical conditions. When light impinges on photoelectrode 13, it causes charging of storage electrode 17 with hydrogen and oxidation of the redox couple in electrolyte 15. On discharge the hydrogen in storage electrode 17 is oxidized and the oxidized specie of the redox couple in electrolyte 15 is reduced at or in the vicinity of the surface of counter electrode 14. Those skilled in the art will appreciate that FIG. 1 is schematic in nature and includes external resistance loads 19 and 20 which in actual practice may either be fixed or may be variable.

Photoelectrode 13, counter electrode 14 and redox electrolyte 15 as described by Manassen et al in the Journal of the Electrochemical Society publication of Apr., 1977 can be used in the present invention. Alternatively, photoelectrode 13 can comprise photoactive gallium phosphide and counter electrode 14 can be carbon, both electrodes being in contact with an aqueous, basic, redox electrolyte 15 in which ferricyanide and ferrocyanide ions are the oxidized and reduced forms respectively of the redox couple. Any other aqueous or non-aqueous redox electrode which does not corrode the photoelectrode and the counter electrode either in the dark or when the electrode is illuminated can be employed. The container means used in accordance with the present invention can be any conventional container means including transparent window 12. Membrane 16 as employed in the present invention is again similar to membranes employed by Manassen et al. The disclosures of Manassen et al with respect to photoelectrodes, containers, counter electrodes, redox electrolytes and membranes are incorporated by reference herein. In contrast to the concepts of Manassen et al., however, the present invention employs as a hydrogen storage electrode 17, a material which has both the capability of occluding or chemically combining with hydrogen and the capability of releasing hydrogen from an associated protonic electrolyte 18 at a low hydrogen overpotential. A list of suitable hydrogen storage materials is set forth in Table I.

TABLE I

| Material | Trade/Designation | Source |
|---|---|---|
| $LaNi_3Co_2$ | Experimental Product | The International Nickel Company, Inc. |
| Pd | Generic Material | General Market |
| $LaNi_5$ | HY-STOR tm 205 | MPD Technology Corp. |
| $LaAl_{0.3}Ni_{4.7}$ | HY-STOR tm 207 | MPD Technology Corp. |

In selecting a hydrogen storage metal or compound for use in the photoelectrochemical system of the present invention, it is necessary to consider the decompositon characteristics of the hydride formed from the particular material used. The hydride must be sufficiently stable at the ambient temperature of the photoelectrochemical system so as not to spontaneously decompose thermally when in a non-charging mode to cause gas pressures in container means 11 which will rupture container means 11. As a general rule, it is advantageous that the hydride formed in a storage electrode have an equilibrium hydrogen decomposition pressure at system ambient temperature of no greater than about 2-3 atmospheres (absolute). More advantageously, the equilibrium decomposition pressure should be less than about 0.5 atmosphere (absolute). Using ordinary sealing means, eg. silicone or epoxy seals for container means 11, it is advantageous that the equilibrium hydrogen decomposition pressure at ambient system temperature be a maximum of about that decomposition pressure exhibited by the hydride of $LaNi_5$. The hydride of $LaNi_5$ exhibits a plateau decomposition pressure of about 1.5 atmosphere (absolute) at 25° C., the plateau decomposition pressure being higher at higher temperatures and lower at lower temperatures. Also, for practical purposes, a hydrogen storage electrode should also be selected bearing in mind its resistance to poisoning by other materials in the photoelectrochemical system. This is especially true when either sulfur or selenium is co-present in the photoelectrochemical system. Usually, membrane 16 will be chosen so as to be selective in retaining ions such as sulfide or ferrocyanide or ferricyanide ions on the redox side of the membrane. However, such selectivity is never 100% and thus the hydrogen storage electrode should be as resistant to poisoning as is practical.

The aforementioned metals, and especially, intermetallic compounds based essentially on the $LaNi_5$ intermetallic system, can be used as storage electrodes in the present invention by applying powder of the intermetallic compound onto an inert metal screen, eg. a nickel screen using a binder. Storage electrodes also can be made of massive material such as the foil of platinized or palladized palladium or palladium alloys. Those skilled in the art will appreciate that during hydriding, intermetallic compounds will not retain a massive structure but will spontaneously break up into fine powder of the hydride material. Accordingly, it is necessary in the usual case to employ a binder to maintain the active hydrogen storing material in contact with an inert current collector.

More particularly, the n-type photoelectrode used in the present invention must be an electrode which when illuminated will exhibit a negative potential value when measured against a standard calomel electrode (SCE). Suitable n-type photoelectrodes are set forth in Table II.

TABLE II

| Photoelectrode | Width of the Optical band gap in eV |
|---|---|
| CdSe | 1.7 |
| CdTe | 1.44 |
| CdS | 2.42 |
| GaAs | 1.43 |
| GaP | 2.25 |

Advantageously, the n-type photoelectrode is a cadmium selenide electrode which is capable of obtaining useful electrical output from visible light. A satisfactory cadium selenide n-type photoelectrode is made by electrode-position from a cadmium sulfate-selenous acid aqueous bath having a pH of about 0 to 1 at a cathode current density of about 3 to 10 mA/cm$^2$. Other means of formation of n-type photoelectrodes are discussed, inter alia, by Manassen et al in column 3 of U.S. Pat. No. 4,064,326.

The results of employing a cadmium selenide electrode in a sulfur/sulfide ion basic aqueous redox electrolyte, a carbon counter electrode and a palladium storage electrode in a basic electrolyte are set forth in FIG. 2a. The palladium storage electrode which has the ability to form palladium hydride charges over a twenty-four hour period as shown in FIG. 2a curve I. Discharge characteristics are shown in FIG. 2b curve II. A storage electrode comprising a $LaNi_3Co_2$ intermetallic compound bonded to a nichrome screen gives the charge and discharge characteristics as shown in FIG. 2b curves I and II respectively. The results shown in FIGS. 2a and 2b are from experimental type apparatus which is illuminated with artifical illumination of the approximate intensity of the visible spectrum of solar illumination in unconcentrated form. Other arrangements of the system of the present invention are possible and for that matter more practical. For completeness, specific details of the experiments resulting in the graphed data of FIG. 2 are set forth in Table III.

TABLE III

| Item | Pd Storage Electrode | $LaNi_3Co_2$ Storage Electrode |
|---|---|---|
| Photoelectrode | | |
| Type | CdSe | CdSe |
| Area Illuminated | about 0.33 cm$^2$ | about 0.33 cm$^2$ |
| CD of Area Illum. | 10 mA/cm$^2$ | 10 mA/cm$^2$ |
| Counter Electrode | | |
| Material | Pt | Pt |
| Area | 4 cm$^2$ | 4 cm$^2$ |
| Redox Electrolyte | | |
| Volume | about 20 cc | about 20 cc |
| pH | 14 | 14 |
| KOH [ ] | 1 M | 1 M |
| Redox System | $S^=/S_x^=$ | $S^=/S_x^=$ |
| Storage Electrode | | |
| Apparent Area | about 1 cm$^2$ | about 1 cm$^2$ |
| Inert Collector | — | nickel |
| Wt. storage mat/cm$^2$ | 0.15 gm | 0.15 gm |
| Assoc. Electrolyte | 1N NaOH | 1N NaOH |

TABLE III-continued

| Item | Pd Storage Electrode | LaNi$_3$Co$_2$ Storage Electrode |
| --- | --- | --- |
| Membrane | | |
| Type | Agar Gel | P2291* |
| Cross-sectional Area | 1 cm$^2$ | 1 cm$^2$ |
| Light Source | | |
| Type | 75 W Xenon Lamp | 75 W Xenon Lamp |
| Intensity on photo-electrode surface | 100 mW/cm$^2$ | 100 mW/cm$^2$ |

*Membrane obtained from Radiations Applications Inc.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A photoelectrochemical system comprising
   (a) an n-type photoelectrode;
   (b) means whereby at least a portion of a surface of said n-type photoelectrode can be illuminated;
   (c) an electrolyte in contact with said at least a portion of a surface of said n-type photoelectrode;
   (d) means in said system to store the charges produced by action of light at the interface of said electrolyte and said at least a portion of said surface of said n-type photoelectrode;
   (e) a hydrogen storage electrode connectable to said n-type photoelectrode by an electronic conductor and through hydrogen-containing electrolyte and comprising a member of the group of metals and intermetallic compounds capable of reacting with hydrogen to form a hydride and hydrides thereof; and
   (f) means for electrically discharging said hydrogen storage electrode against an electrode energized by charges stored in said storage means.

2. A system as in claim 1 wherein said storage means is a redox electrolyte.

3. A system as in claim 2 wherein said redox electrolyte and an inert electrode constitute an electrode activated by oxidized species in said redox electrolyte.

4. A photoelectrochemical system comprising
   (a) an n-type photoelectrode;
   (b) means whereby at least a portion of a surface of said photoelectrode can be illuminated;
   (c) an inert counter electrode, both said portion of said surface of said photoelectode and said counter electrode being in contact with
   (d) a suitable redox electrolyte;
   (e) a hydrogen storage electrode connectable to said photoelectrode by an electrical conductor and comprising a member of the group of metals and intermetallic compounds capable of reacting with hydrogen to form a hydride and hydrides thereof in contact with
   (f) a compatible electrolyte, said electrolyte being physically separated from said suitable redox electrolyte by
   (g) an ion permeable membrane, said hydrogen storage electrode being connectable to said inert electrode through a load.

5. A photoelectrochemical system as in claim 4 wherein said hydrogen storage electrode comprises a hydride-forming intermetallic compound bonded to an inert current collecting support.

6. A photoelectrochemical system as in claim 5 wherein said hydride-forming intermetallic compound is selected from the group of LaNi$_5$, LaNi$_3$Co$_2$ and LaAl$_{0.3}$Ni$_{4.7}$.

7. A photoelectrochemical system as in claim 4 wherein said redox electrolyte is an aqueous chalcogenide redox electrolyte and said ion permeable membrane is selective to prohibit transport of the chalcogen ion.

* * * * *